United States Patent Office.

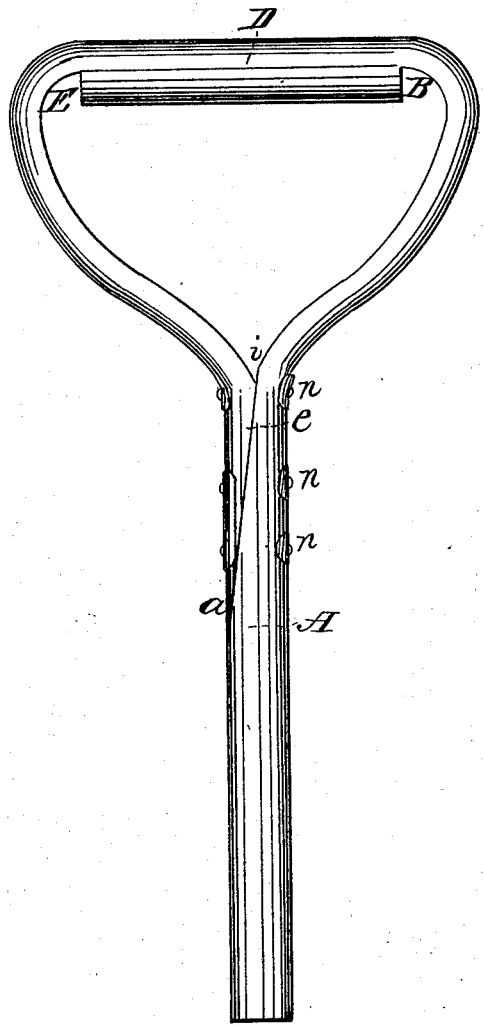

IMPROVEMENT IN SPADE HANDLES.

CHARLES DIMMICK, OF BROCKPORT, NEW YORK.

*Letters Patent No. 60,152, dated December 4, 1866.*

SPECIFICATION.

TO ALL WHOM IT MAY CONCERN:

Be it known that I, CHARLES DIMMICK, of Brockport, in the county of Monroe, and State of New York, have invented a new and improved Spade Handle; and I do hereby declare that the following is a full, clear, and exact description thereof, reference being had to the accompanying drawing, and to the letters of reference marked thereon, forming a part of this specification.

This invention has for its object to form a spade or shovel handle from one piece of wood; and it consists in turning out a piece of wood to a suitable size; and at a proper distance from the end the wood is cut out, each side of what is intended for a handle, so as to leave one-half of the timber, which leaves it a half round, which is bent round and the end secured by any well-known means to the body of the handle so as to form a loop.

To enable others skilled in the art to make and use my invention, I will proceed to describe its construction and operation.

The figure represents a plan of my improved handle.

Letters of like name and kind refer to like parts in the figure.

A represents a handle made of wood, after my improved mode, from a straight piece of timber, first turned in a lathe or worked out round in any other manner. I then commence at the point $a$ and cut out the timber tapering, as represented by the line $e$, to the handle or point, B, at which point I leave a space of sufficient length for the handle, D. E is a square shoulder, as seen at B, and about one-half of the timber cut away to the point $i$, where it is tapered to a point so that the size will correspond with the main shaft or body of the handle, A, and made round; the end thus bent round, as shown in the model and drawings, is rigidly secured to the main shaft of the handle, A, by means of screws or rivets, $n\,n\,n$. The common method of making the handles for shovels and spades, &c., is to cut the handle out of a board or piece of timber across the grain and rivet the same. But this mode is of but little utility, as by a little exposure to the weather the handle soon becomes fractured from the action of the atmosphere and becomes useless. By my invention this difficulty is obviated, from the fact that the grain runs straight with the handle; therefore there is no liability of its being fractured from the action of the atmosphere or other causes; which makes a handle that is light as well as strong and durable.

Having thus described my invention, what I claim as new, and desire to secure by Letters Patent, is—

Making a spade or other handle from a straight piece of wood, formed and bent round in the manner substantially as herein shown and described, and for the purposes set forth.

CHARLES DIMMICK.

Witnesses:
    DANIEL HOLMES,
    R. CHICKERING.